(12) United States Patent
Arngren et al.

(10) Patent No.: US 9,753,989 B2
(45) Date of Patent: Sep. 5, 2017

(54) METHOD, CONTENT RANKING SYSTEM, AND COMPUTER PROGRAM PRODUCT FOR RANKING CONTENT BASED ON SUBSCRIBER INFORMATION

(71) Applicant: Telefonaktiebolaget L M Ericsson (PUBL), Stockholm (SE)

(72) Inventors: Tommy Arngren, Södra Sunderbyn (SE); Jörgen Gustafsson, Luleá (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 545 days.

(21) Appl. No.: 14/184,207

(22) Filed: Feb. 19, 2014

(65) Prior Publication Data
US 2015/0234824 A1 Aug. 20, 2015

(51) Int. Cl.
G06F 17/30 (2006.01)
(52) U.S. Cl.
CPC .... G06F 17/3053 (2013.01); G06F 17/30867 (2013.01)
(58) Field of Classification Search
CPC .................. G06F 17/3053; G06F 17/30867
See application file for complete search history.

(56) References Cited

U.S. PATENT DOCUMENTS

| | | | | |
|---|---|---|---|---|
| 8,554,601 B1* | 10/2013 | Marsh | ..................... | G06Q 30/02 705/7.32 |
| 2005/0138044 A1* | 6/2005 | Roemke | .............. | G06F 17/3089 |
| 2005/0240580 A1* | 10/2005 | Zamir | ................ | G06F 17/30867 |
| 2006/0123014 A1* | 6/2006 | Ng | ..................... | G06F 17/30864 |
| 2007/0061245 A1* | 3/2007 | Ramer | .............. | G06F 17/30867 705/37 |
| 2008/0097986 A1* | 4/2008 | Shih | ................... | G06F 17/30867 |
| 2008/0104034 A1* | 5/2008 | Stewart | ............. | G06F 17/30867 |
| 2008/0207217 A1* | 8/2008 | Ramanathan | ........... | H04W 4/02 455/456.1 |

(Continued)

OTHER PUBLICATIONS

Cisco White Paper; Cisco Visual Networking Index Index: Global Mobile Data Traffic Forecast Update, 2012-2017; 2013; 34 pages.

(Continued)

Primary Examiner — Shiow-Jy Fan
(74) Attorney, Agent, or Firm — Patent Portfolio Builders, PLLC

(57) ABSTRACT

A system, method, and computer program product are presented for ranking content items. The system receives from a telecommunications network information indicating that a first subscriber has consumed a first content item through the telecommunications network, and adds an indication of the content consumption to a database. The system further receives information indicating that a second subscriber has consumed a second content item through the network, and adds an indication of the content consumption to the database. The system obtains a search result identifying a set of content items. It determines a first total number of subscribers who consumed the content item and a second total number of subscribers who consumed the content item and are determined to be similar to the requesting subscriber based on network-collected information. The system calculates a rank value for the content item using the first total number and the second total number.

21 Claims, 11 Drawing Sheets

(56) References Cited

U.S. PATENT DOCUMENTS

| | | | |
|---|---|---|---|
| 2008/0319986 A1* | 12/2008 | Shapira | G06F 17/30867 |
| 2012/0296909 A1* | 11/2012 | Cao | G06F 17/30867 |
| | | | 707/737 |
| 2014/0067953 A1* | 3/2014 | Weinstein | G06Q 10/10 |
| | | | 709/204 |
| 2014/0172773 A1* | 6/2014 | Schmidt | G06N 7/00 |
| | | | 706/54 |
| 2015/0113554 A1* | 4/2015 | Stern | H04N 21/252 |
| | | | 725/32 |

OTHER PUBLICATIONS

Cisco White Paper; Cisco Visual Networking Index: Forecast and Methodology, 2011-2016; 2012;16 pages.

* cited by examiner

METHOD, CONTENT RANKING SYSTEM, AND COMPUTER PROGRAM PRODUCT FOR RANKING CONTENT BASED ON SUBSCRIBER INFORMATION

TECHNICAL FIELD

This disclosure relates to a method, content ranking system, and computer program product for ranking content based on subscriber information.

BACKGROUND

The amount of content available from content hosting services like Youtube, Akamai, or HBO Go is growing. By some estimates, 60 hours of video content is uploaded to YouTube's content servers every minute and the site receives 800 million unique visitors each month.

Some content hosting services make it possible to search the content on their sites, which could be a broadcaster's play channel, a video sharing site, a Video on Demand (VoD) site, or a personal home theater platform. Some content hosting services also tag multimedia content using audiovisual metadata like title, description, duration, and keyword.

Search engines like Google and Bing also allow a user to search for content. Google's search engine relies on the page rank algorithm for ranking search results. Another example of a search and indexing system is disclosed in US 2013/0226930-A1. What is desired is an improved way of ranking content items.

SUMMARY

The present disclosure relates to ranking content items (e.g., videos, songs) that can be accessed through a telecommunications network. The telecommunications network may comprise a core network part of a cellular telecommunications network, such as a $3^{rd}$ Generation Partnership Project (3GPP) System Architecture Evolution (SAE) evolved packet core (EPC) network or any future cellular core network, and an access network part, such as UTRAN (Universal Mobile Telecommunications System (UMTS) Terrestrial Radio Access Network) or E-UTRAN (LTE Evolved UMTS Terrestrial RAN) and any future access network (such as a LTE-advanced network) that is able to communicate with a core network. In some embodiments, a core network can communicate with a non-3GPP access network, such as a WiFi™ (IEEE 802.11) access network (e.g., WiFi™ access point), such as provided in various 3GPP specifications relating to communication between 3GPP and non-3GPP systems. Furthermore, the telecommunications network may provide subscribers of the telecommunications network with access to a public packet data network (e.g., Internet) that includes content servers that host such content items. The ranking leverages information that is available to the telecommunications network. Such information may include when subscribers consumed a content item, where they consumed the content item, and a level of network service used by such subscribers in consuming the content item. When a requesting subscriber of the telecommunications network submits a query for content items (e.g., based on keyword), each of a set of content items matching the query can thus be ranked based on which other subscribers of the telecommunications network consumed the content item and how those other subscribers accessed the telecommunications network in consuming the content item. The ranking may gauge how relevant a particular content item is to the requesting subscriber based on a similarity between the requesting subscriber's query and aspects of how other subscribers accessed the telecommunications network in consuming the content item.

In one aspect a method for ranking content is provided. The method is performed by a content ranking system that is connected to one or more network gateways of a network operator's telecommunications network. The content ranking system receives from one of the one or more network gateways first information indicating that a first subscriber of the telecommunications network has consumed a first content item. The content item was transmitted by a first content server external to the telecommunications network to the first subscriber through the telecommunications network. The content ranking system updates a subscriber database that comprises subscriber content consumption information. The subscriber content consumption information identifies content items consumed by subscribers of the telecommunications network. Updating the subscriber database comprises adding to the subscriber content consumption information first subscriber information indicating that the first subscriber has consumed the first content item. The content ranking system also receives second information indicating that a second subscriber has consumed a second content item that was transmitted by a second content server to the second subscriber. The first content server in the embodiment is operated by a content hosting service that is different than a content hosting service that operates the second content server. The content ranking system obtains a search result identifying a set of content items that satisfy a query. For a content item included in the set of content items, the content ranking system uses the subscriber content consumption information from the subscriber database to determine i) a first total number of subscribers of the telecommunications network who have consumed the content item and ii) a second total number of subscribers of the telecommunications network who a) consumed the content item and b) are determined to be similar to the requesting subscriber based on information collected by the telecommunications network. The content ranking system calculates a rank value to assign to the content item based on the first total number of subscribers and the second total number of subscribers.

In some instances, subscribers who are determined to be similar to the requesting subscriber includes subscribers i) who have a similar level of network service as a level of network service subscribed to by the requesting subscriber ii) who consumed the content item at a similar time as a time at which the query was received, iii) who have a similar travel pattern as the requesting subscriber, or iv) who are determined to communicate with the requesting subscriber through the telecommunications network more than a threshold number of times.

In some instances, the content ranking system calculates a rank value for a content item based on a point in time at which one of the subscribers accessed the telecommunications network in consuming the content item. In such instances, the content ranking system determines the amount of time between i) the point in time that the query was received and ii) the point in time when the subscriber consumed the content item. The content ranking system in such instances calculates a time factor using the determined amount of time and calculates the rank value using the time factor.

In some instances, the query is received from a requesting subscriber's communication device when the communication device is located at a first location. In such instances, the content ranking system calculates the rank value to assign to the content item based on the first location. The calculation in such instances comprises determining the distance between i) the first location and ii) a second location, wherein the second location is a location at which another subscriber was located when the another subscriber consumed the content item. The calculation in such instances further includes calculating a location factor using the determined distance and calculating the rank value using the location factor.

Features, objects, and advantages of the present disclosure will become apparent to those skilled in the art by reading the following detailed description where references will be made to the appended figures.

DETAILED DESCRIPTION

The present disclosure is concerned with ranking content items, such as content items in a search result for multimedia content, based on insight that a telecommunications network (e.g., a cellular telephone network that provides access to a public packet data network) has on what content have been consumed by its subscribers and how those subscribers used the telecommunications network in consuming the content. The ranking may be performed by a network operator of the telecommunications network (e.g., operator of a 3GPP SAE EPC network or other core network), or may be performed by a third party that accesses subscriber information collected by the telecommunications network. The ranking may leverage information about the content consumption information (e.g., viewing or listening patterns) of the telecommunications network's subscribers to rank content. More particularly, the subscribers may access multimedia and other content through the telecommunications network. Because the multimedia content passes through the telecommunications network, the telecommunications network may collect information about what content was consumed, where it was consumed, when it was consumed, which subscriber consumed the content, or any other information about the content consumption. For instance, subscribers may voluntarily allow the network operator to collect metadata when they access multimedia or other content through the telecommunications network, and such metadata may provide information about the content consumption. The collected information may include information that is unique to a telecommunications network, or is otherwise unavailable to general search engines. A content ranking system can then leverage the collected information to rank a list of content items in a manner that is relevant to subscribers of the telecommunications network. The ranking may gauge how many subscribers have consumed a particular content item and/or how similar those instances of content consumption are to a requesting subscriber's query.

Figure 1:
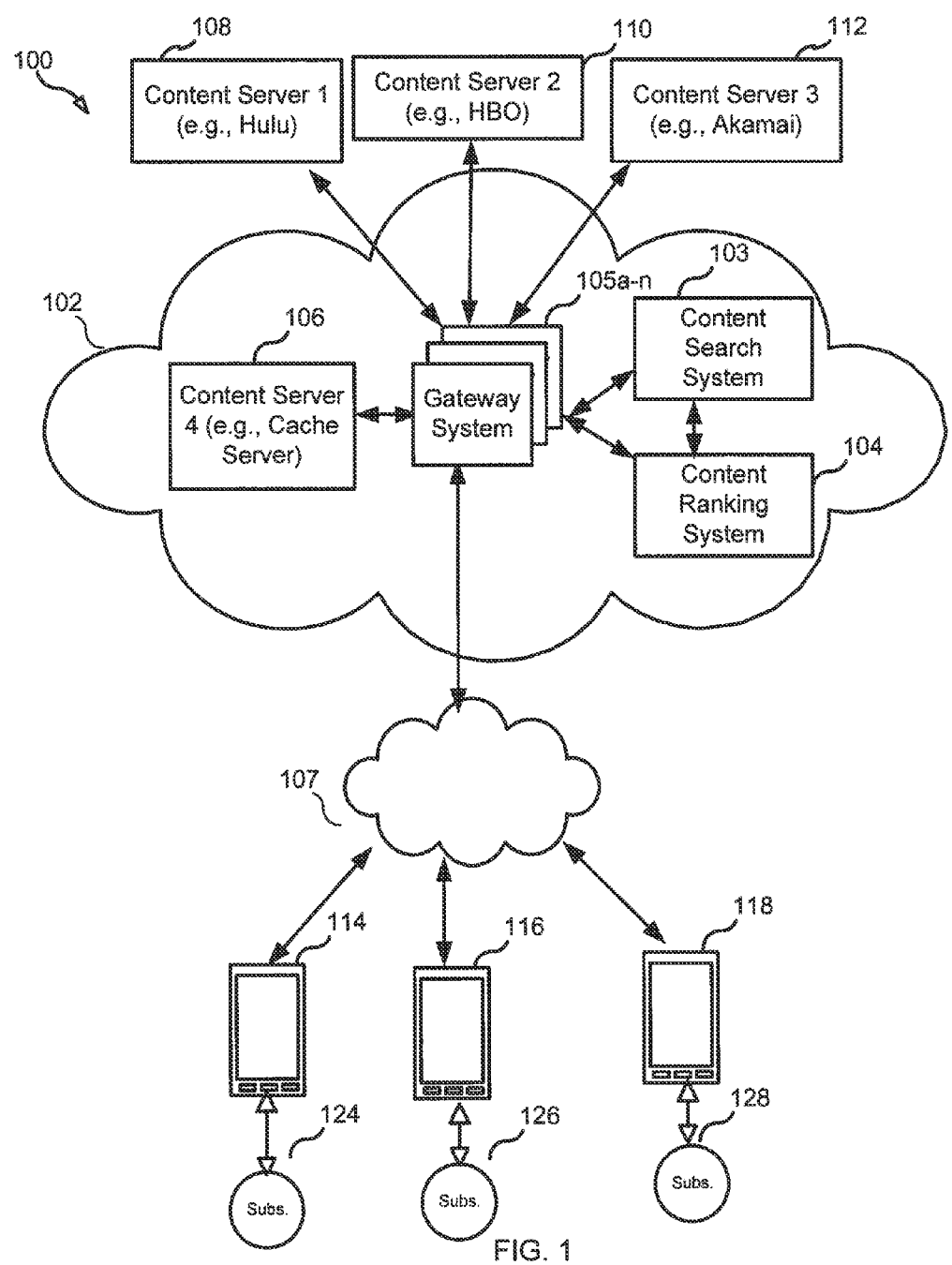
FIG. 1 illustrates a system that includes a telecommunications network and a content ranking system.

FIG. 1 illustrates an example system 100 that allows content items to be searched and/or accessed. In an embodiment, a telecommunications network 102 operated by a network operator provides subscribers with access to content on a public packet data network. Examples of a network operator include a Mobile Network Operator and a Mobile Virtual Network Operator (MVNO). For instance, telecommunications network 102 can be a cellular telephone network that provides subscribers 124, 126, and 128 with wireless data access to the Internet through their communication devices, 114, 116, 118 (e.g., smartphone or tablet computer). As a more specific example, the telecommunications network can include a radio access network (RAN) and a core network. The RAN can be, for example, a Universal Mobile Telecommunications System (UMTS) Terrestrial Radio Access Network (UTRAN) or an evolved-UTRAN (E-UTRAN). The core network can include a 3GPP-developed core network, such as a System Architecture Evolution (SAE) Evolved Packet Core (EPC) network or Mobile Application Part (MAP) network. In the example, the operator of the telecommunications network may operate both a RAN and a core network, or operate only a core network (e.g., a third party may operate the RAN). In some instances, the telecommunications network 102 may be connected to an access network 107 (RAN). In cases where the telecommunications network 102 includes only the core network, the access network 107 may be a third-party network that provides cellular base stations or WiFi™ access points, for example, connecting the telecommunications network 102 to its subscribers. In cases where the telecommunications network 102 includes both the core network and its own access network, the access network 107 may be a third-party RAN, for example, that supplements the coverage of the telecommunications network 102's access network.

The content accessed from the Internet may be stored on or streamed by different content servers, such as servers 106, 108, 110, and 112. In some instances, the content servers may be operated by different content hosting services. A content hosting service includes content providers (e.g., HBO, NBC, CBS, Netflix, Hulu) that produce or is producing (for live events) at least some of the content being hosted and includes more general content hosting entities (e.g., Youtube, Akamai). The content servers (e.g., 108, 110, 112) on the Internet may be external to the telecommunications network 102. The telecommunications network 102 itself, however, can also operate a content server. For example, telecommunications network 102 includes a content server 106 that provides cached multimedia content. When a subscriber consumes a content item stored on or streamed by one of the content servers 106, 108, 110, 112, the content thus passes through the telecommunications network 102 to reach the subscriber. In the example in FIG. 1, the content passes through one or more network gateways 105a-n of the telecommunications network 102. For instance, a subscriber can submit a request to a content server. This request will pass through one of the one or more gateways 105a-n before being received by the content server. The content server may then transmit a requested content item to the subscriber. The content item will pass through the one or more gateways 105a-n before being received by the subscriber's device.

In an embodiment, the content items stored on or streamed by the content servers include videos, songs, audiobooks, and/or e-books. A subscriber can consume the content item by downloading, streaming, or any other manner for consuming the content item.

In an embodiment, the telecommunications network 102 receives queries (e.g., a keyword search) from subscribers for content on the content servers 106, 108, 110, 112. The telecommunications network 102 includes a content search system 103 that generates a list of content items on the content servers 106, 108, 110, 112 that match the query. The telecommunications network 102 further includes a content ranking system 104 that ranks content items based on, for example, content consumption information collected by the telecommunications network 102. In some cases, the list of content items outputted by the content search system 103 is ranked by search system 103, and the content ranking system 104 generates a new ranking. In some implementations, the content search system 103 and the content ranking system 104 are integrated into a single system/device (e.g., a communication device), and use the same processor and/or storage device. In some implementations, the content search system 103 generates the list of content items and transmits the list to a separate content ranking system 104.

Although FIG. 1 illustrates a content search system 103 and content ranking system 104 that are both part of the telecommunications network 102, in other embodiments one or both systems may be external to the telecommunications network 102. Such embodiments allow a third party system to perform a search and/or search ranking service based on subscriber information provided by the telecommunications network 102.

Figure 2:
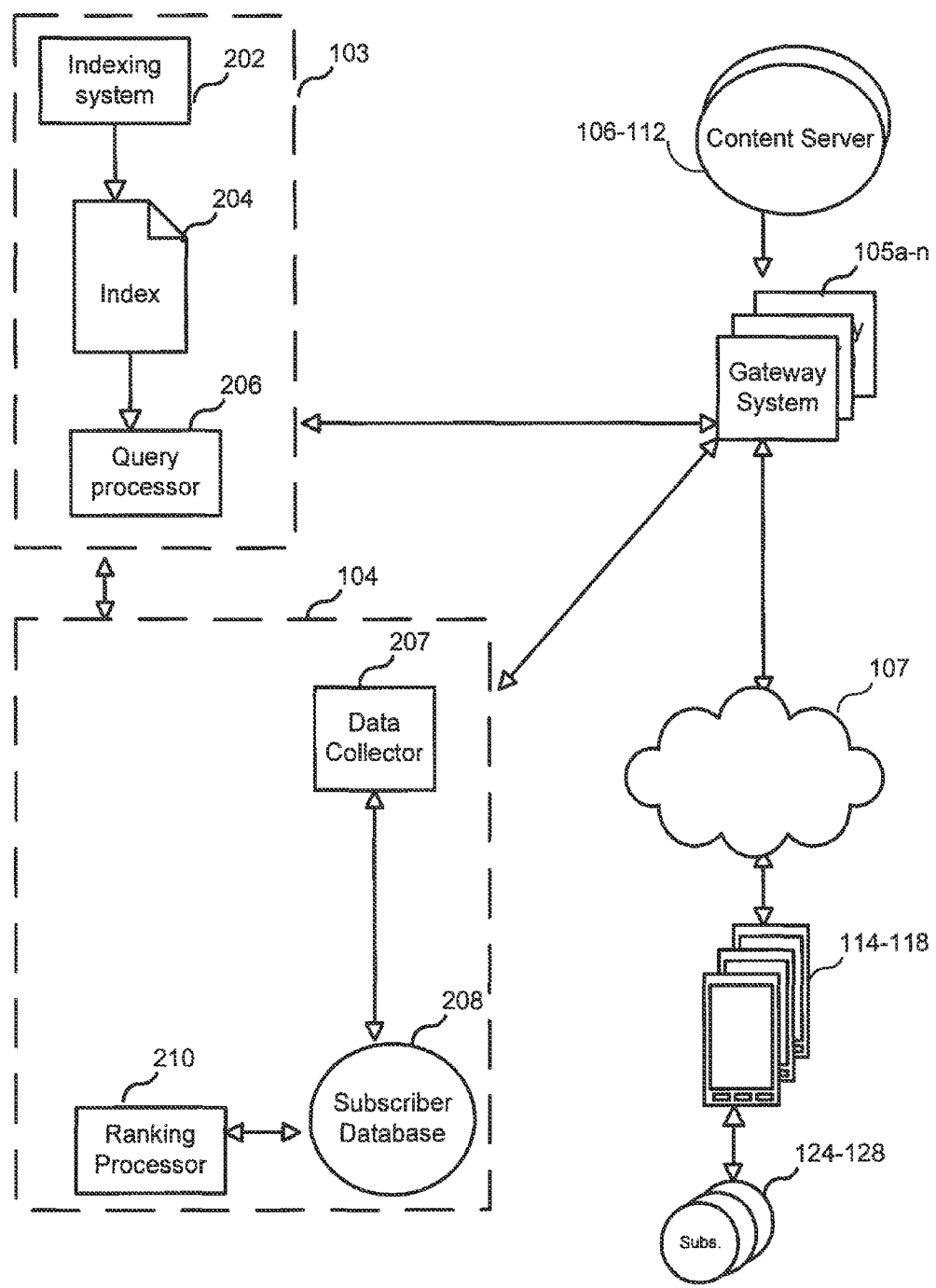
FIG. 2 illustrates an example content ranking system and content search system.

FIG. 2 illustrates an example embodiment of the content search system 103 and the content ranking system 104. The content search system 103 includes an indexing system 202 that generates an index 204 of content items available from content servers. As an example, the indexing system 202 may communicate with content servers 106, 108, 110, 112 to discover what content items are available on the servers, and populate the index 204 or update the index 204 with information identifying the available content items. The information may identify a content server from which a content item is available. A query processor 206 may use the index 204 to generate a list of content items that match the query. In one example, the list is a list of URL's that each references a content item on one of the content servers. In some instances, a content item such as a particular video may be available from multiple content servers.

In an embodiment, the content ranking system 104 includes a subscriber database 208 and a data collector 207 that stores information in subscriber database 208. The database 208 stores subscriber information that is leveraged by a ranking processor 210 to rank content items.

Figure 3:
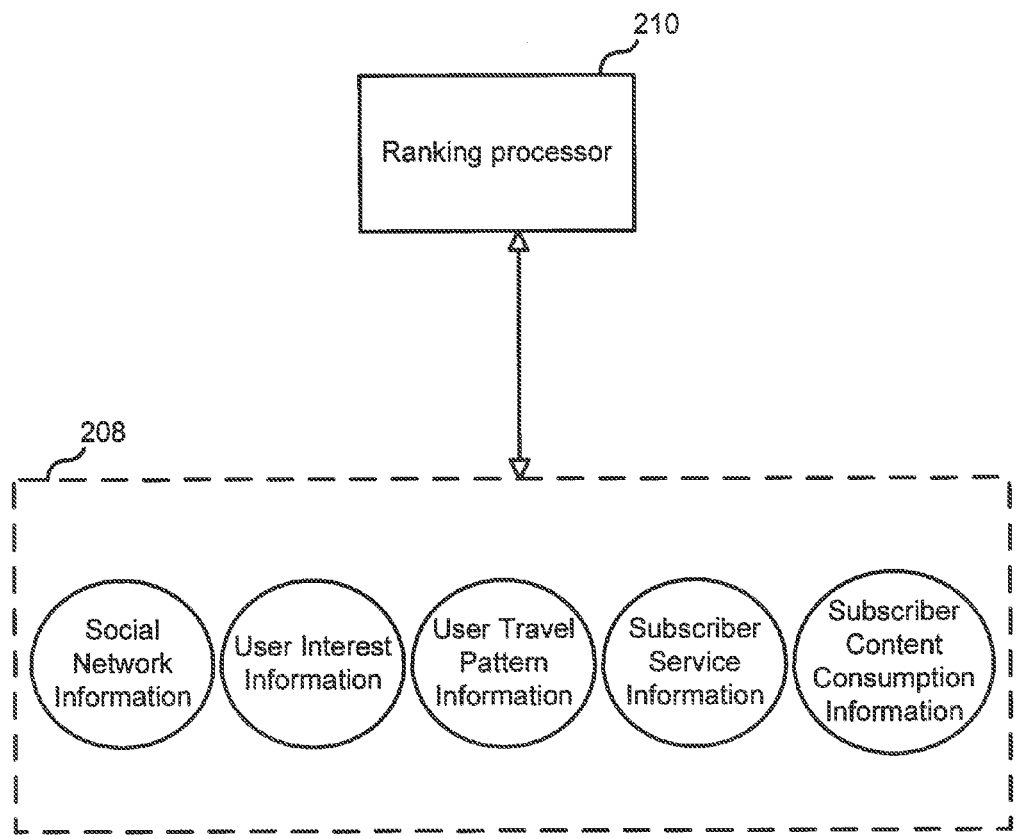
FIG. 3 illustrates an example subscriber database.

FIG. 3 illustrates an embodiment of the subscriber database 208, which includes social networking information, user interest information, user travel pattern information, subscriber service information, and subscriber content consumption information. In an embodiment, the data collector 207 may generate and maintain such information based on how the subscriber uses the telecommunications network 102.

In one example, social networking information, for each subscriber, includes information linking the subscriber with a set of zero or more other subscribers. In some cases, the data collector 207 may identify which subscriber to link to a given subscriber based on telecommunication data. For example, it may monitor network traffic and identify subscribers who call, text, or otherwise communicate with each other using the telecommunications network 102. Subscribers who communicate with each other with sufficient frequency may be identified as members of the same social network and linked together in the subscriber database 208. In some cases, the data collector 207 may seek a given subscriber's permission to access an external social network profile (e.g., a Facebook profile) to determine a list of other subscribers who are in the given subscriber's social network and to include information in the database linking the determined subscribers with the given subscriber.

In one example, user interest information can be used to identify subscribers with a common interest. The information may be indexed by topic, for instance, and identify all subscribers who have shown an interest in that topic. In some cases, the data collector 207 identifies a subscriber's interest based on telecommunications data that identify what websites the subscriber accesses through the telecommunications network 102. More specifically, as the subscriber submits a requested URL to a content server, the request will pass through one of the one or more gateways 105*a-n* of the telecommunications network 102. The telecommunications network may copy the URL and pass it to the data collector 207, which attempts to match the URL with a category of interest from a list of categories.

In one example, user travel pattern information identifies a set of locations where a subscriber has been in a certain time period and/or routes that the subscriber has taken over that time period. In one example, user travel pattern information includes information about a speed of the subscriber's travel, which may be used to infer the subscriber's mode of transportation. The user travel pattern information may be determined in some cases based on telecommunications data. For instance, the telecommunications network 102 can estimate, periodically or during handover, a location of a subscriber's device using a radio access network (RAN) based technique such as observed time difference of arrival (OTDOA), which relies on signaling between the subscriber's device and the RAN, or any other location determining technique.

In one example, subscriber service information includes telecommunication information that identifies a level of network service to which the subscriber has subscribed from the operator of the telecommunications network 102. The information may include, for example, a monthly data allowance for the network service, a guaranteed bit rate for the network service, a quality of service (QoS) for the network service, or an access bearer allocated to the subscriber for the network service. Examples of a network service include a telephone call or enablement service, a messaging service (e.g., SMS or MMS), a video conferencing service (e.g., Lync, Skype, etc.), a music service (e.g., Spotify), a video streaming service (e.g., IPTV or VoD service), a content retrieval service that retrieves content via the Internet, a positioning service, a social network application service (e.g., Facebook, Snapchat, Whatsapp, or Instagram service), application-on-demand service, a banking or payment service available via the Internet, and a remote monitoring service (e.g., for heater control, remote alarm, remote video surveillance, or remote sensors such as remote temperature sensors).

In an embodiment, subscriber content consumption information identifies what content items a particular subscriber has consumed, when the content consumption was consumed, where it was consumed, the level of network service used to consume the content item, or any other information describing the content consumption. Like the user interest information, the subscriber content consumption information may be generated based on a subscriber's request to a content server. Because the requested content item (e.g., video or song) and the request itself both pass through the one or more gateways 105*a-n* of the telecommunications network, the telecommunications network may extract information about the content consumption and provide such information to the data collector 207. The data collector 207 may store in the database 208 information indicating, e.g., that the subscriber has downloaded or streamed the content item, a time at which the content item was consumed, a location of the subscriber when the content item was consumed, and the subscriber's level of network service.

In an embodiment, the content consumption information identifies how many subscribers have consumed a particular content item. In cases where subscribers consume the same content item from different content servers, the data collector 207 may be configured to recognize that the same content item was or is being consumed. For example, if two subscribers submit two different URL's to request the same movie, song, or other content item, the data collector 207 may recognize that the two subscribers are consuming the same content item, based on file names of the content items, tags extracted from the content items, or any other metadata. In an embodiment, the content consumption information identifies times at which various subscribers consumed a particular content item and/or locations at which various subscribers consumed the particular content item.

Figure 4:
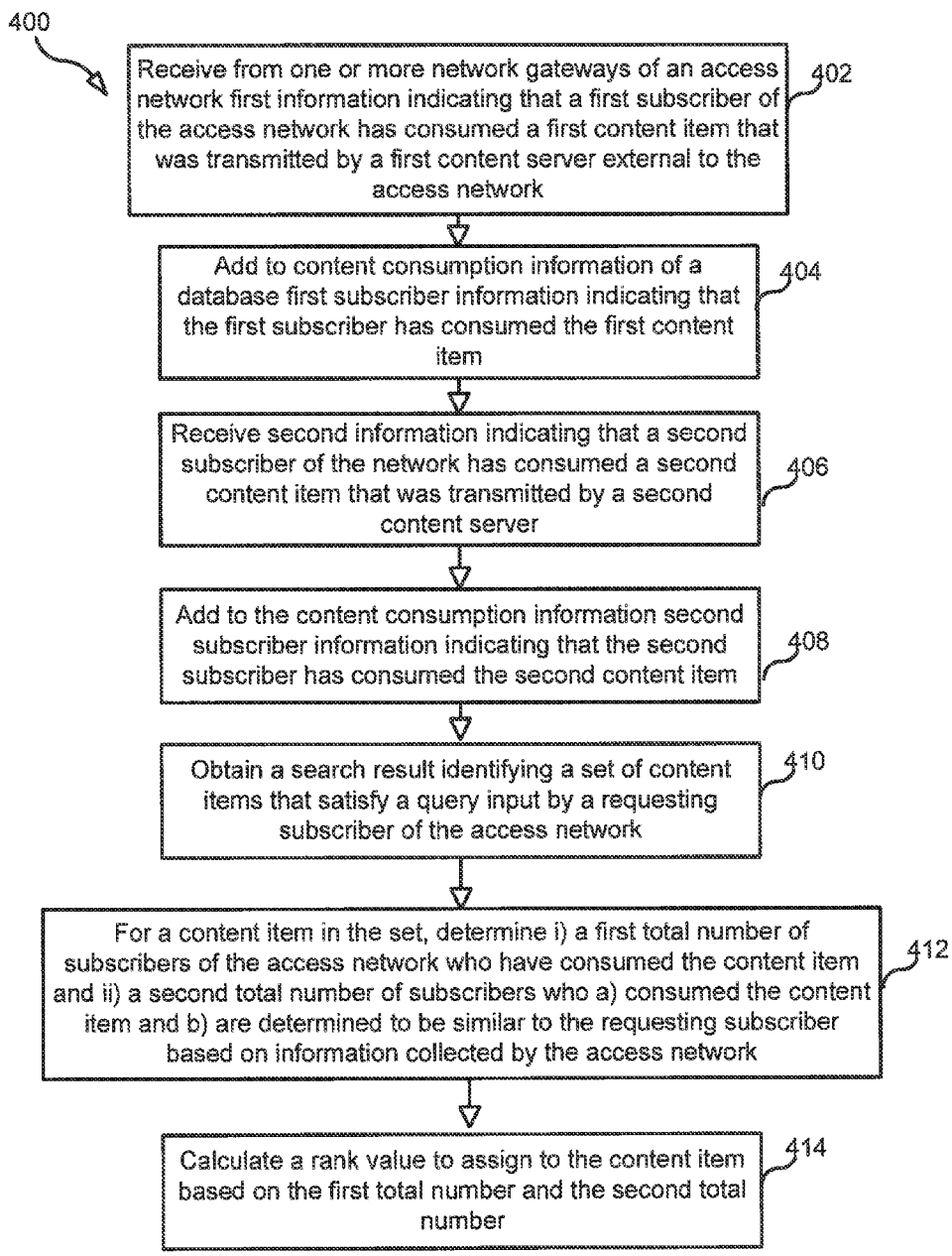
FIGS. 4-9 illustrate flow diagrams according to embodiments of the present disclosure.

FIG. 4 is a flow diagram illustrating a process 400 performed by a content ranking system (e.g., content ranking system 104) for ranking a set of content items that makes up a search result for a requesting subscriber.

In an embodiment, the process 400 begins at step 402, in which the content ranking system receives from one or more gateways of a telecommunications network first information indicating that a first subscriber of the telecommunications network has consumed a first content item. In the embodiment, the telecommunications network provides access to a public packet data network, and the content item was transmitted by a first content server external to the telecommunications network to the first subscriber through the telecommunications network.

In the step, the content ranking system gathers information on content consumption behavior that it can later use to rank content items. In one example, as subscribers attempt to access content items through the telecommunications network, the telecommunications network may collect metadata or any other information about the content consumption and provide that information to the content ranking system. The metadata includes, for instance, metadata provided by the content item's content server (e.g., content item's title or category) and metadata specifically provided by the telecommunications network, such as a subscriber ID of the subscriber, a level of network service subscribed to by the subscriber, a time at which the content item was consumed, and a location at which the content item was consumed. The content ranking system that receives such information can be part of the telecommunications network, or can be a third party ranking service that has access to such telecommunications data.

In step 404, the content ranking system updates a subscriber database (e.g., subscriber database 208) that comprises subscriber content consumption information. The subscriber content consumption information identifies content items consumed by the subscribers of the telecommunications network. In an embodiment, the system updates the database by adding first subscriber information to the subscriber content consumption information. In the embodiment, the first subscriber information indicates that the first subscriber has consumed the first content item. For example, the first subscriber information indicates that a particular subscriber has used the telecommunications network to watch a particular home improvement video from Youtube, and that the subscriber watched the video on a Monday near a particular radio access network (RAN) of the telecommunications network. In the database, the first subscriber information may be associated with a content item's ID, such as a URL, so that the database is able to identify all subscribers who consumed the content associated with a particular content item's ID.

In step 406, the content ranking system receives second information indicating that a second subscriber of the telecommunications network has consumed a second content item that was transmitted by a second content server to the second subscriber through the telecommunications network. In an embodiment, the first content server is operated by a content hosting service that is different than a content hosting service that operates the second content server. As one example, the first content server is operated by Youtube, while the second content server is operated by Hulu. As another example, the first content server is operated by Youtube, while the second content server is a cache server operated by the operator of the telecommunications network. Steps 402 and 406 illustrate that the content ranking system is able to collect information on content consumption behavior for multiple content sources (e.g., multiple content hosting services). The content ranking system has this capability because the content from the multiple content hosting services all pass through the telecommunications network, which is thus able to monitor content consumption behavior independent of the content hosting service from which the content is accessed. While FIG. 2 illustrates receiving information about the consumption of a first content item and a second content item, the content ranking system may receive content consumption information for, e.g., hundreds, thousands, millions, etc. of content items.

In step 408, the content ranking system updates the subscriber database by adding second subscriber information to the content consumption information. The second subscriber information indicates that the second consumer has consumed the second content item. In an embodiment where content items are accessed via URL's, the content ranking system may be configured to recognize when two URL's refer to the same content item. For instance, a particular video (e.g., a commercial) may be stored on both Youtube and Hulu, and may be referenced by different URL's. The content ranking system may be configured to recognize from metadata that the two URL's refer to two instances of the same content item. In updating the subscriber database, the content ranking system may associate the content consumption information for the two subscribers with a unique content item ID, or may associate a particular URL with both subscribers' content consumption information.

In step 410, the content ranking system obtains a search result that identifies a set of content items that satisfy a query from a requesting subscriber of the telecommunications network. In an embodiment, the content ranking system and content search system are part of the same system, such that the content ranking system generates the search result. In an embodiment, the content ranking system is separate from the content search system, such that the content ranking system receives a transmission of the search result from the content ranking system. In an embodiment, the search result is a list of references to content items that match a subscriber's query. For example, if a subscriber submits a query for bicycle trips to the Swedish island Gotland, the content search system generates a list of references to videos on various content servers (e.g., content servers 106, 108, 110, 112) that relate to bicycle trips and/or Gotland. Each reference can be a URL or any other reference to a content item. In more specific instances, each reference is a URL that points to a specific part of the content item (e.g., the URL references a point that is 2 minutes, 10 seconds into a particular video).

In step 412, the content ranking system determines, for a content item in the set, i) a first total number of subscribers of the telecommunications network who have consumed the content item and ii) a second total number of subscribers of the telecommunications network who a) consumed the content item and b) are determined to be similar to the requesting subscriber based on information collected by the telecommunications network. The determination may be based on information stored in the subscriber database. For instance, when a subscriber previously consumed a content item through the telecommunications network, information about when the subscriber consumed the content item, where the subscriber consumed the content item, and/or the network service level (e.g., QoS) with which the subscriber consumed the content item can be conveyed to the content ranking system, which stored such information. The telecommunications network may further have previously provided information on the subscribers (e.g., travel pattern information, subscriber service information) to the content ranking system, which stored such information. The stored information associated with a particular subscriber may be used to determine whether that particular subscriber is similar to the requesting subscriber. A more detailed example of this determination is provided below, with respect to FIG. 9.

In step 414, the content ranking system calculates a rank to assign to the content item based on the first total number of subscribers and the second total number of subscribers. In an embodiment, the first total number and the second total number are used to calculate a subscriber similarity factor, which is in turn used to calculate the rank value. A more detailed example of the subscriber similarity factor is provided later in the disclosure.

Figure 5:
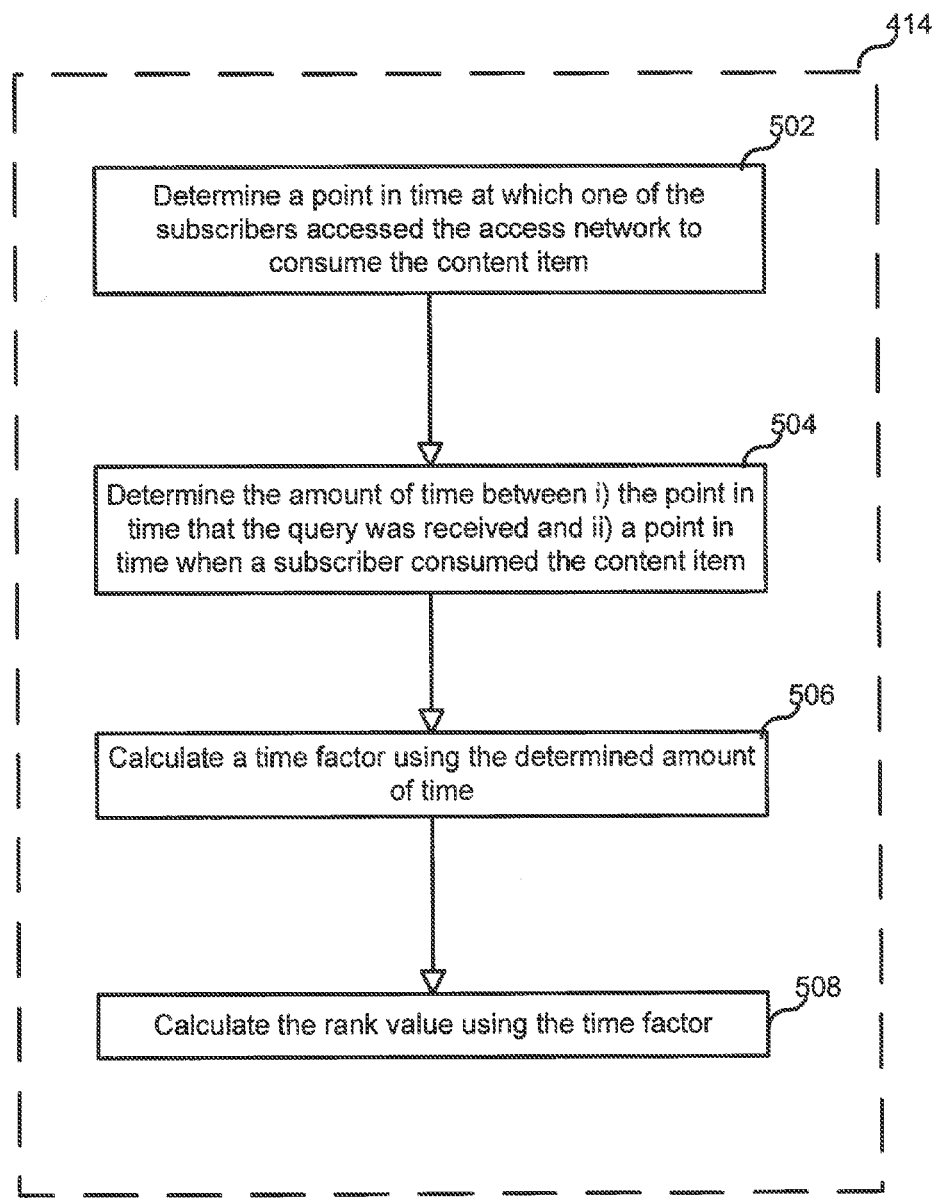

In an embodiment, the calculation of the rank value in step 414 for a content item may further be based on how close in time did other subscribers consume the content item compared to when the query was received. FIG. 5 illustrates such an embodiment. In step 502, the content ranking system determines a point in time at which one of the subscribers accessed the telecommunications network to consume the content item. As discussed above, the determination may be based on subscriber content consumption information that was stored when a subscriber accessed the telecommunications network to consume the content item.

In step 504, the content ranking system determines an amount of time between i) the point in time that the query was received from the requesting subscriber and ii) a point in time when a subscriber consumed the content item. While FIG. 5 illustrates determining the above time difference for one subscriber who consumed the content item, the step may be repeated for each subscriber who consumed the content item, such that multiple differences in time are calculated and used in calculating the rank value. In an embodiment, the difference in the points in time may include a difference in the time of day (e.g., did the subscriber consume the content item at night, when the query was received), time of week (e.g., did the subscriber consume the content item on a weekend, when the query was received), time of month, time of year, or absolute difference in time.

In step 506, the content ranking system calculates a time factor using the determined amount of time. An example of the content ranking system is described in more detail with respect to FIG. 6, which calculates a time factor as a sum of derived values that are each based on a difference between the content consumption time for a particular subscriber and the query time.

In step 508, the content ranking system calculates the rank value for the content item using the calculated time factor. For example, the time factor can be added to a location factor and a subscriber similarity factor, which are described later in the disclosure, to yield the rank value.

Figure 6:
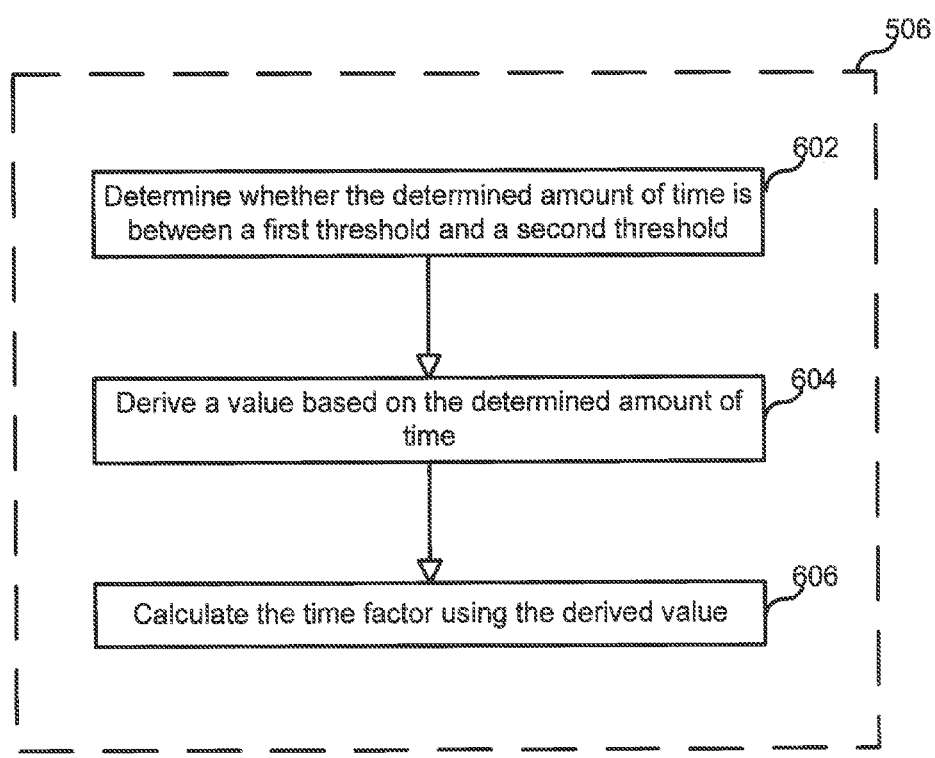

FIG. 6 provides a flow diagram that illustrates example steps for how the time factor for a content item is calculated. In the example, the calculation begins at step 602, in which the content ranking system determines whether the determined amount of time between the point in time when a subscriber consumed the content item and a point in time when the query was received is between a first threshold and a second threshold. The determination may gauge how relevant a particular content item is to a query based on how close the content consumption time is to the query time. In one example, the determination may determine whether the content was consumed by a particular subscriber more than one hour before the query was received, but not more than one week before the query was received. In another example, if the query is received at 9:00 PM on a weeknight, the content ranking system may determine whether a subscriber consumed the content item between 7:00 PM and 11:00 PM on a weeknight.

In step 604, the content ranking system derives a value based on the determined amount of time, in response to determining that the determined amount of time is between the first threshold and the second threshold. In an embodiment, the derived value may be a predetermined weight assigned to instances of content consumption that fall between the first threshold and the second threshold. If the time difference instead fell below the first threshold, it may be assigned a second value that indicates the content item is more relevant to the query. If the time difference is more than the second threshold, it may be assigned a third value that indicates the content item is less relevant to the query. While FIG. 6 illustrates steps 602 and 604 for one subscriber that consumed a particular content item, the steps may be repeated for other subscribers who also consumed the content item. In those steps, other derived values may be determined based on when the other subscribers consumed the content item.

In step 606, the content ranking system calculates the time factor using the derived value. In an embodiment, the derived value for the subscriber is added to the derived values for other subscribers who have consumed the content item. In a more specific example, the time factor for a particular content item is calculated as:

$$\text{Time Factor }(i\text{th Content item}) = \sum_{k=1}^{Tot\_Consuming\_Subscribers} \frac{t(k)}{Tot\_Consuming\_Subscribers}$$

In the example, Tot_Consuming_Subscribers represents the total number of subscribers who have consumed the ith content item in the search result. For the kth subscriber in the total number of subscribers, a derived value t(k) is calculated. For instance, the derived value is based on a time offset t_offset between when a query is received and when the kth subscriber consumed the content item. If t_offset is less than a first threshold (e.g., 1 hour), t(k) is assigned a first value of, e.g., 1. If t_offset is greater than a second threshold (e.g., 1 year), t(k) is assigned a second value of, e.g., 0.01. If t_offset has a value between the first threshold and the second threshold, t(k) is assigned a third value of, e.g., 0.1. More generally, the relationship between the derived value and the time offset may be linear, exponential, or any other relationship.

Figure 7:
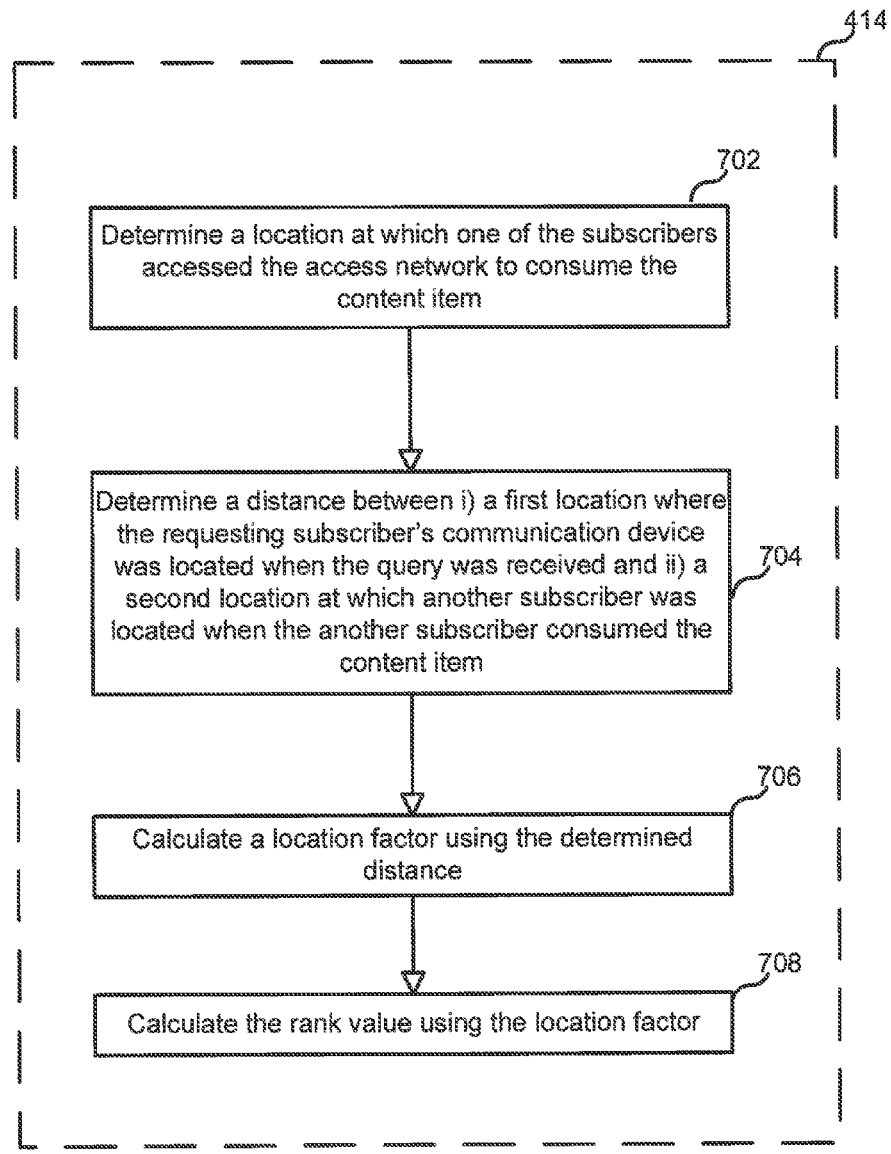

In an embodiment, the calculation of a rank value for a content item in step 414 may be based on a proximity between where a subscriber consumed the content item and a location of the requesting subscriber when that subscriber submitted the query. FIG. 7 illustrates such an embodiment. In step 702, in the content ranking system determines a location at which one of the subscribers accessed the telecommunications network to consume the content item. In an embodiment, the content ranking system may determine the location from the subscriber database. For instance, when the subscriber consumed the content item, the telecommunications network may determine the subscriber's location and communicate that location to the content ranking system. The determined location may be as coarse as a RAN (e.g., radio base station or cell identity) that provided the subscriber with access to the content item, or may include a more precise coordinates of the subscriber's device when the content item was consumed. Such coordinates may be determined using a technique such as OTDOA or any other location-determining technique.

In step 704, the content ranking system determines a distance between i) a first location where the requesting subscriber's communication device was located when the query was received and ii) a second location at which another subscriber was located when the another subscriber consumed the content item. The determination may gauge a relevance of a content item to a query based on whether other subscribers who consumed the content item are geographically close to the requesting subscriber. In some instances, the determined distance may be a physical distance (e.g., 1 km). In some instances, the determined distance may be in a unit that reflects whether the subscriber who consumed the content item is in a same campus, office, city, county, or state as the requesting subscriber. While FIG. 7 illustrates steps 702 and 704 for one subscriber who consumed a content item, such steps can be repeated for each subscriber who consumed the content item, so that multiple distances are calculated and used to calculate the rank value.

In step 706, the content ranking system calculates a location factor using the determined distance. As described in more detail with respect to FIG. 8, one example of the location factor calculation involves assigning a derived value to the distance calculated in step 704.

In step 708, the content ranking system calculates the rank value using the location factor. As illustrated above, the location factor can be added to the time factor and a subscriber relationship factor, described below, to yield the rank value.

Figure 8:
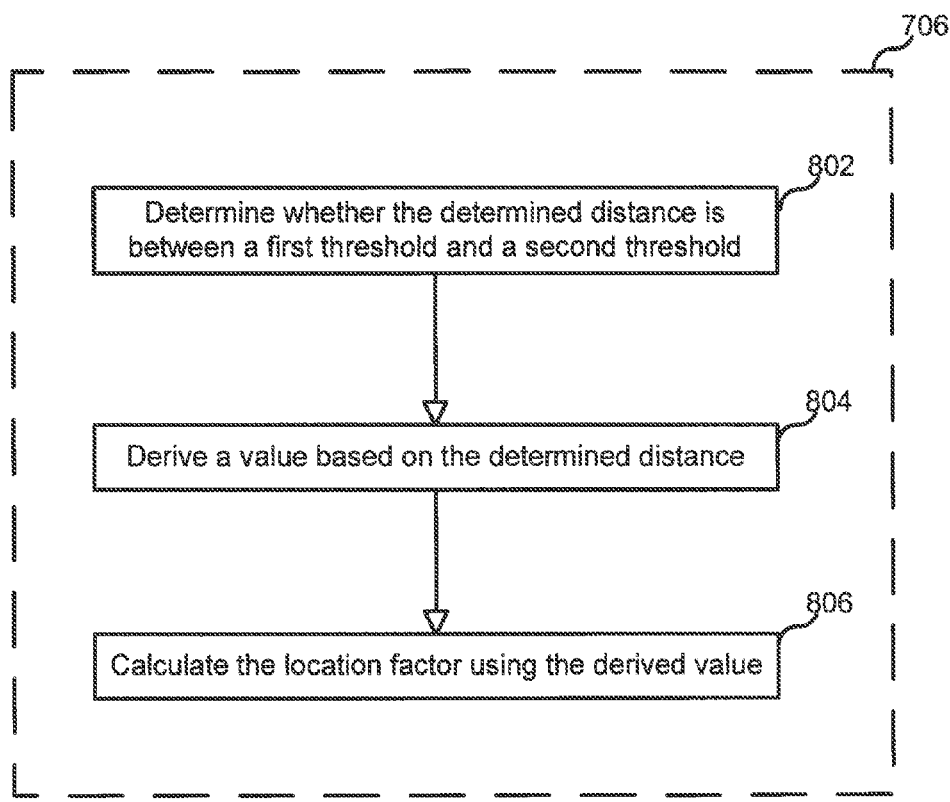

FIG. 8 provides a flow diagram that illustrates example steps of the calculation of a location factor for a content item. In an embodiment, the example calculation begins at step 802, in which the content ranking system determines whether the determined distance between where a subscriber consumed the content item and a location from which a query was received is between a first threshold and a second threshold.

In step 804, the content ranking system derives a value based on the determined distance in response to determining that the determined distance is between the first threshold and the second threshold. In one example, the derived value is assigned a first value if the distance fall between the first threshold and a second threshold. If the distance falls below the first threshold, the derived value may be assigned a second value that indicates the content item is more relevant to the query. If the distance is more than the second threshold, the derived value may be assigned a third value that indicates the content item is less relevant to the query. While FIG. 8 illustrates steps 802 and 804 being performed for one subscriber who consumed the content item, the steps may be repeated for all subscribers who consumed the content item.

In step 806, the content ranking system calculates the location factor using the derived value, such as by adding a plurality of derived values that each corresponds to respective subscribers who consumed the content item. In a more specific example, the location factor is calculated as $$\text{Location Factor } (i\text{th content item}) = \sum_{k=1}^{Tot\_Consuming\_Subscribers} \frac{p(k)}{Tot\_Consuming\_Subscribers}$$

In the example, Tot_Consuming_Subscribers represents a total number of subscribers who have consumed the ith content item in the search result. P(k) represents a derived value for the kth subscriber who consumed the content item, and may be based on a proximity offset p_offset. The p_offset value may be equal to, for instance, the distance determined in step 704. If p_offset is less than a first threshold (e.g., 100 m), p(k) may be assigned a first value of, e.g., 1. If p_offset is greater than a second threshold (e.g., 5000 km), p(k) may be assigned a second value of, e.g., 0.01. If p_offset is between the first threshold and the second threshold, p(k) may be assigned a third value of, e.g., 0.1. More generally, the relationship between p_offset and the derived value may be linear, exponential, or any other relationship.

Figure 9:
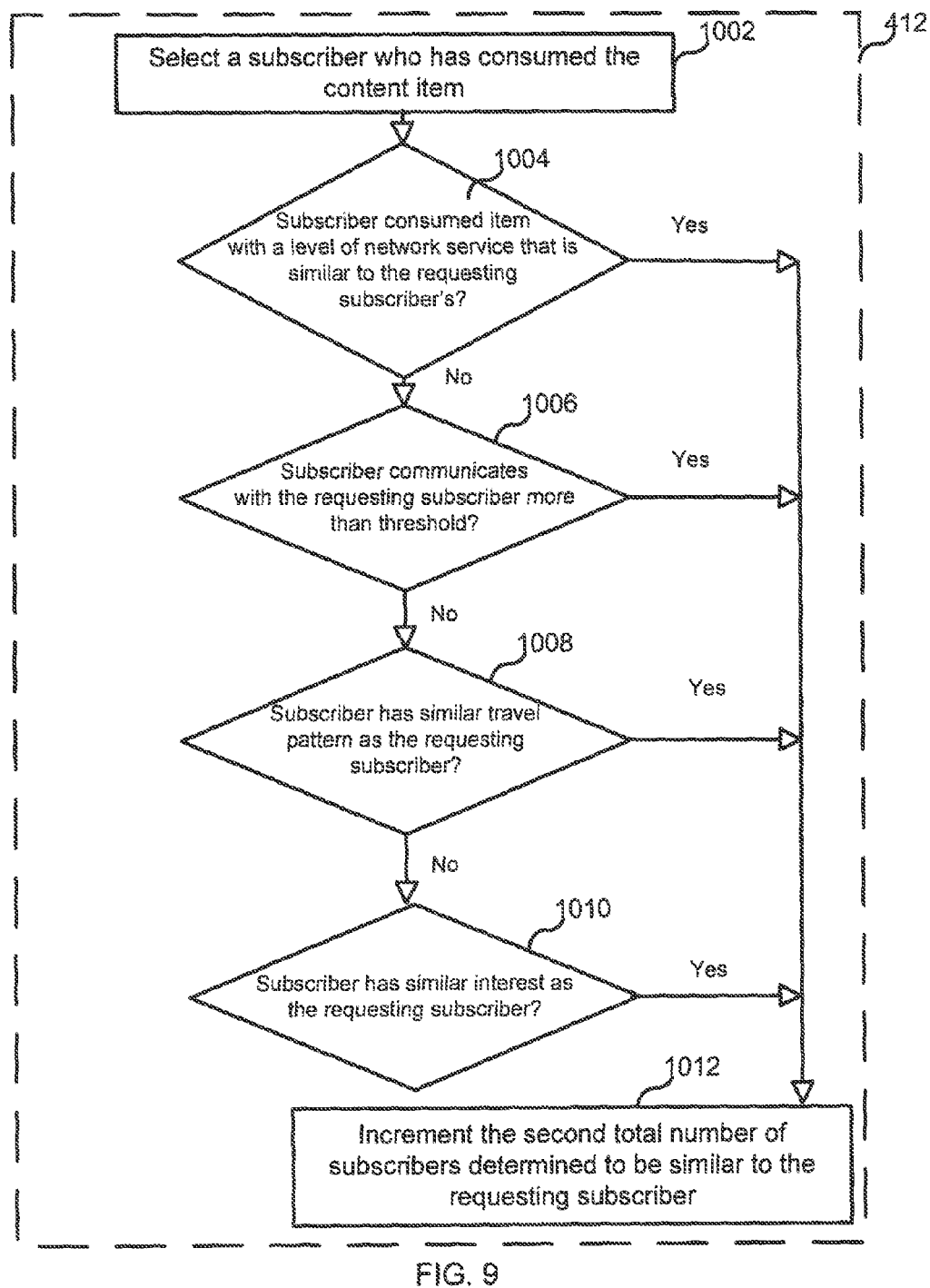

As discussed above, the rank value for a content item may be based on a total number of subscribers who have consumed the content item and are determined to be similar to the requesting subscriber. FIG. 9 provides a more detailed example of how this total number is calculated. Generally speaking, the example determines whether a particular subscriber is similar to the requesting subscriber based on whether the two subscribers have a similar level of network service, whether the two subscribers communicate with each other using the telecommunications network more than a threshold number of times, whether the two subscribers have similar travel patterns, or whether the two subscribers have similar interests. The determination may be based on information in the subscriber database, which may in turn be based on subscriber traffic information collected by the telecommunications network.

In step 1002, the content ranking system selects a subscriber who has consumed the content item. The selection may be made from the subscriber database, which may associate a content item's ID with all subscribers who have consumed the content item.

In step 1004, the content ranking system determines whether the subscriber consumed the content item with a level of network service that is similar to the requesting subscriber's level of network service. For instance, the query from the requesting subscriber may identify a wireless data plan, QoS, or other information regarding what level of service the network provides to the requesting subscriber. In response to determining that the selected subscriber consumed the content item with a similar level of network service as the requesting subscriber's level of network service, the content ranking system increments the total number of subscribers determined to be similar to the requesting subscriber in step 1012.

In step 1006, the content ranking system determines whether the subscriber communicates with the requesting subscriber more than a threshold number of times. This determination may reflect whether the selected subscriber and the requesting subscriber are part of the same social network based on how often they communicate with each other using the telecommunications network. In an embodiment, social network information in the subscriber database may capture whether the requesting subscriber and the selected subscriber have communicated more than a threshold number of times. For example, the telecommunications network may monitor communication traffic between subscribers and determine, based on a pattern in the communication traffic, which subscribers should be considered as belonging to a social network. The telecommunications network may provide that information to the content ranking system, which may link the subscribers in the subscriber database. In an example, the information may include an entry that is indexed by the requesting subscriber's ID and may identify all subscribers who have been determined, based on communication traffic in the telecommunications network, to be in one of the requesting subscriber's social networks. In response to determining that the selected subscriber communicates with the requesting subscriber more than the threshold number of times, the content ranking system increments the second total number of similar subscribers in step 1012.

In step 1008, the content ranking system determines whether the selected subscriber has a similar travel pattern as the requesting subscriber. The determination may be based on whether the subscribers have occupied a similar set of locations in a predetermined time window, whether the subscribers take similar routes between a set of locations, or any combination thereof. In an embodiment, the determination is based on user travel pattern information in the subscriber database. The user travel pattern information may overlap with aspects of the subscriber content consumption information related to where a content item was consumed. The travel pattern information may be based on information provided to the content ranking system from the telecommunications network. In response to determining that the selected subscriber and the requesting subscriber have a similar travel pattern, the content ranking system increments the second total number of similar subscribers in step 1012.

In step 1010, the content ranking system determines whether the selected subscriber has a similar interest as the requesting subscriber. As discussed above, the telecommunications network may provide insight on a subscriber's interest based on what the subscriber accesses on the Internet using the telecommunications network. Such information may be provided to the content ranking system and stored in the subscriber database as user interest information. In some cases, the user interest information may overlap with the subscriber content consumption information, since a subscriber's consumed content provides an indication of the subscriber's interest. In some cases, the subscriber content consumption information may be limited to the consumption of multimedia content, while user interest information may be based on any type of content (e.g., a webpage) that the subscriber has accessed. In response to determining that the selected subscriber has a similar interest as the requesting subscriber, the content ranking system increments the second total number of similar subscribers in step 1012.

In an embodiment, the first total number and/or the second total number calculated in step 412 may be used to calculate a subscriber similarity factor, which may be used in calculating the rank value. In the example, the total number of subscribers in the telecommunications network is referred to as Tot_Subscribers. The first total number of subscribers who have consumed a content item is referred to as Tot_Consuming_Subscribers. The second total number of subscribers who have consumed the content item and who are determined to be similar to the requesting subscriber is referred to as Tot_Rel_Consuming_Subscribers. The example further calculates the following totals:

$U_{sn}$: the total number of subscribers who have consumed the content item and who are determined to be in a social network of the requesting subscriber.

$U_{si}$: the total number of subscribers who have consumed the content item and who are determined to have a similar interest as the requesting subscriber.

$U_{tp}$: the total number of subscribers who have consumed the content item and who are determined to have a similar travel pattern as the requesting subscriber.

$U_{su}$: the total number of subscribers who have consumed the content item with a level of service that is similar to the requesting subscriber's level of network service.

The example calculates the following ratios based on the second total number:

$$V_{sn} = U_{sn}/\text{Tot\_Rel\_Consuming\_Subscribers}$$

$$V_{si} = U_{si}/\text{Tot\_Rel\_Consuming\_Subscribers}$$

$$V_{tp} = U_{tp}/\text{Tot\_Rel\_Consuming\_Subscribers}$$

$$V_{su} = U_{su}/\text{Tot\_Rel\_Consuming\_Subscribers}$$

The example further calculates a subscriber similarity factor as $$\text{Subscriber similarity factor } (i\text{th content item}) = 0.5\left(\frac{\text{Tot\_Consuming\_Subscribers}}{\text{Total\_Subscribers}}\right) + 0.5(Vsn + Vsi + Vtp + Vsu)$$

In an embodiment, the set of content items obtained by the content ranking system as part of a search result may already be ranked. In such instances, the content ranking system may adjust the ranking by multiplying the ranking with the calculated rank value (i.e., New Ranking=Rank Value×Old Ranking). In an example, the rank value is calculated as:

Rank value=Time Factor+Location Factor+Subscriber Similarity Factor+1

After calculating the new rankings for all the content items in a search result, the content ranking system may re-order the search result based on the new rankings and present the result to the requesting subscriber as an ordered list.

Exemplary Content Ranking System

Figure 10:
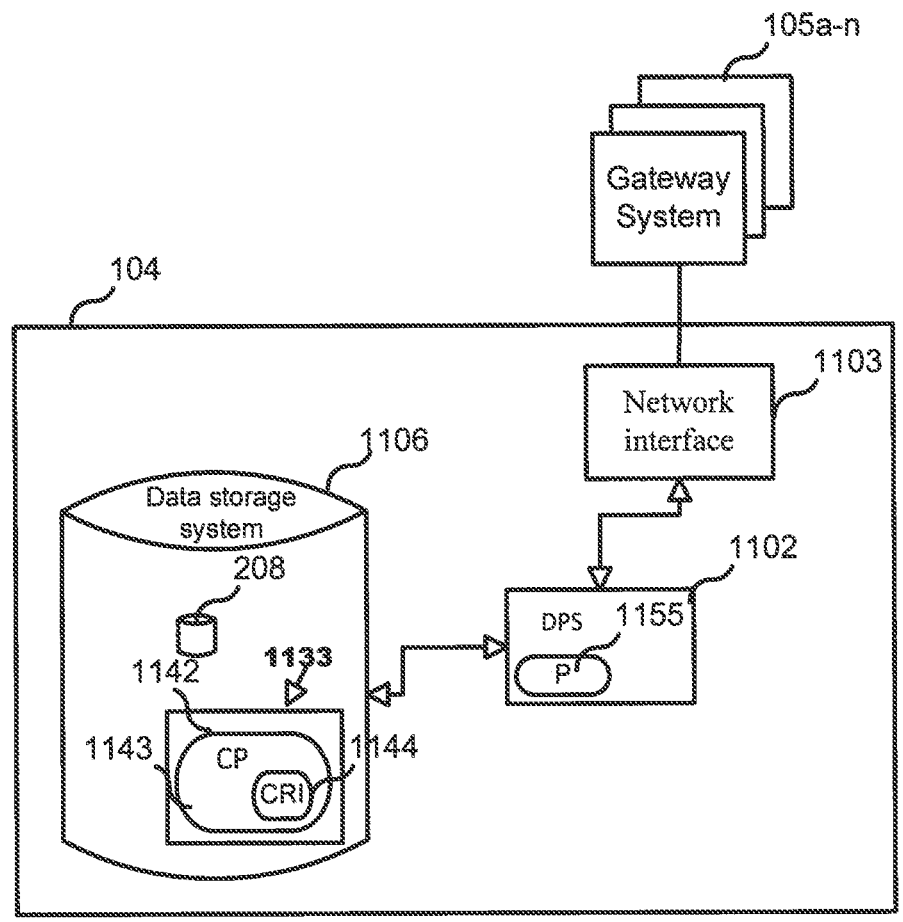
FIG. 10 illustrates a content ranking system according to one embodiment of the present disclosure.

FIG. 10 illustrates a block diagram of content ranking system 104 according to some embodiments. As shown in FIG. 10, the content ranking system 104 may include: a data processing system (DPS) 1102, which may include one or more processors 1155 (e.g., a microprocessor) and/or one or more circuits, such as an application specific integrated circuit (ASIC), Field-programmable gate arrays (FPGAs), etc.; a transceiver 1103 for receiving message from, and transmitting messages to, another apparatus; a data storage system 1106, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1102 includes a processor (e.g., ranking processor 210), a computer program product 1133 may be provided, which computer program product includes: computer readable program code 1143 (e.g., instructions), which implements a computer program, stored on a computer readable medium 1142 of data storage system 1106, such as, but not limited, to magnetic media (e.g., a hard disk), optical media (e.g., a DVD), memory devices (e.g., random access memory), etc. In some embodiments, computer readable program code 1143 is configured such that, when executed by data processing system 1102, code 1143 causes the data processing system 1102 to perform steps described herein. In some embodiments, system 104 may be configured to perform steps described above without the need for code 1143. For example, data processing system 1102 may consist merely of specialized hardware, such as one or more application-specific integrated circuits (ASICs). Hence, the features of the present invention described above may be implemented in hardware and/or software.

Figure 11:
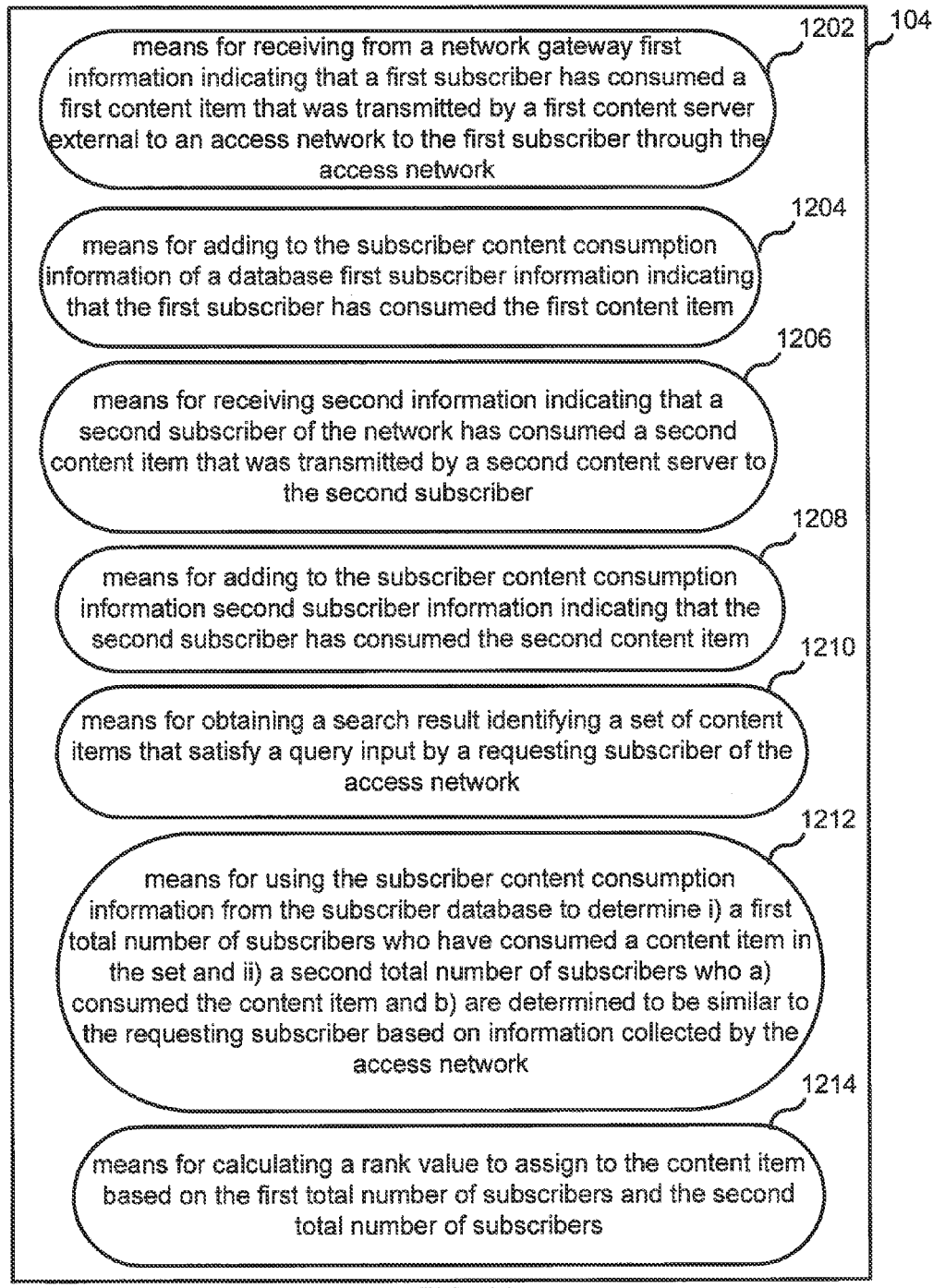
FIG. 11 illustrates a content ranking system according to one embodiment of the present disclosure.

FIG. 11 illustrates various components of a content ranking system. The components include: a) means 1202 for receiving from a network gateway first information indicating that a first subscriber has consumed a first content item that was transmitted by a first content server external to the telecommunications network to the first subscriber through the telecommunications network; b) means 1204 for adding to the subscriber content consumption information of a database first subscriber information indicating that the first subscriber has consumed the first content item; c) means 1206 for receiving second information indicating that a second subscriber of the telecommunications network has consumed a second content item that was transmitted by a second content server to the second subscriber, d) means 1208 for adding to the subscriber content consumption information second subscriber information indicating that the second subscriber has consumed the second content item; e) means for (1210) obtaining a search result identifying a set of content items that satisfy a query input by a requesting subscriber of the telecommunications network; f) means for (1212) using the subscriber content consumption information from the subscriber database to determine i) a first total number of subscribers of the telecommunications network who have consumed a content item in the set and ii) a second total number of subscribers of the telecommunications network who a) consumed the content item and b) are determined to be similar to the requesting subscriber based on information collected by the telecommunications network; and g) means for (1214) calculating a rank value to assign to the content item using the first total number of subscribers and the second total number of subscribers.

In an embodiment, the components may refer to different pieces of computer-readable instructions on a non-transitory computer readable medium, and may be executed by the same processor, or by different processors.

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for ranking content, the method being performed by a content ranking system that is connected to one or more network gateways of a network operator's telecommunications network, and comprising the following steps performed by a data processing system of the content ranking system:
receiving from one of the one or more network gateways first information indicating that a first subscriber of the telecommunications network has consumed a first content item that was transmitted by a first content server external to the telecommunications network to the first subscriber through the telecommunications network;
updating a subscriber database comprising subscriber content consumption information identifying content items consumed by subscribers of the telecommunications network, wherein updating the subscriber database comprises adding to the subscriber content consumption information a first subscriber information indicating that the first subscriber has consumed the first content item;
receiving second information indicating that a second subscriber of the telecommunications network has consumed a second content item that was transmitted by a second content server to the second subscriber, wherein the first content server is operated by a content hosting service that is different from a content hosting service that operates the second content server;
adding to the subscriber content consumption information a second subscriber information indicating that the second subscriber has consumed the second content item;
obtaining a search result identifying a set of content items that satisfy a query input by a requesting subscriber of the telecommunications network;
for a content item included in the set of content items, using the subscriber content consumption information from the subscriber database to determine i) a first total number of subscribers of the telecommunications network who have consumed the content item in the set of content items and ii) a second total number of subscribers of the telecommunications network who a) consumed the content item in the set of content items and b) are determined to be similar to the requesting subscriber based on subscriber network traffic information collected by the telecommunications network;
calculating a subscriber similarity factor for the content item in the set of content items using the first total number of subscribers and the second total number of subscribers;
calculating a rank value for the content item in the set of content items using the calculated subscriber similarity factor and assigning the calculated rank value to the content item in the set of content items and reordering the content item in the set of content items based on the calculated rank value; and presenting the result to the requesting subscriber as an ordered list.

2. The method of claim 1, wherein calculating the rank value for the content item in the set of content items is further based on a point in time at which one of the subscribers accessed the telecommunications network in consuming the content item in the set of content items, and comprises:

determining an amount of time between i) a point in time when the query was received and ii) the point in time when a subscriber consumed the content item in the set of content items;

calculating a time factor using the determined amount of time; and calculating the rank value using the time factor.

3. The method of claim 2, wherein calculating the time factor using the determined amount of time comprises:

determining whether the determined amount of time is between a first threshold and a second threshold;

in response to determining that the determined amount of time is between the first and second thresholds, deriving a value based on the determined amount of time; and calculating the time factor using the derived value.

4. The method of claim 1, wherein the query is received from a requesting subscriber's communication device when the communication device is located at a first location, and the step of calculating the rank value to assign to the content item in the set of content items is based on the first location, and comprises:

determining a distance between i) the first location and ii) a second location, wherein the second location is a location at which a communication device of another subscriber was located when the another subscriber consumed the content item in the set of content items;

calculating a location factor using the determined distance; and calculating the rank value using the location factor.

5. The method of claim 4, wherein calculating the location factor using the determined distance comprises:

determining whether the determined distance is between a first threshold and a second threshold;

in response to determining that the determined distance is between the first and second thresholds, deriving a value based on the determined distance; and calculating the location factor using the derived value.

6. The method of claim 1, wherein the subscribers who are determined to be similar to the requesting subscriber includes subscribers i) who have a similar level of network service as a level of network service subscribed to by the requesting subscriber ii) who consumed the content item in the set of content items at a similar time as a time at which the query was received, iii) who have a similar travel pattern as a travel pattern of the requesting subscriber, or iv) who are determined to communicate with the requesting subscriber through the telecommunications network more than a threshold number of times.

7. The method of claim 6, wherein the subscribers who are determined to be similar to the requesting subscriber further includes subscribers who are determined based on the telecommunications network's collected data to have a similar interest as the requesting subscriber.

8. A content ranking system connected to one or more network gateways of a network operator's telecommunications network and comprising a data processing system and a data storage system, said data storage system containing computer readable instructions executable by said data processing system to:

receive from one of the one or more network gateways first information indicating that a first subscriber of the telecommunications network has consumed a first content item that was transmitted by a first content server external to the telecommunications network to the first subscriber through the telecommunications network;

update a subscriber database comprising subscriber content consumption information identifying content items consumed by subscribers of the telecommunications network, wherein the updating the subscriber database comprises adding to the subscriber content consumption information a first subscriber information indicating that the first subscriber has consumed the first content item;

receive second information indicating that a second subscriber of the telecommunications network has consumed a second content item that was transmitted by a second content server to the second subscriber, wherein the first content server is operated by a content hosting service that is different from a content hosting service that operates the second content server;

add to the subscriber content consumption information a second subscriber information indicating that the second subscriber has consumed the second content item;

obtain a search result identifying a set of content items that satisfy a query input by a requesting subscriber of the telecommunications network;

for a content item included in the set of content items, use the subscriber content consumption information from the subscriber database to determine i) a first total number of subscribers of the telecommunications network who have consumed the content item in the set of content items and ii) a second total number of subscribers of the telecommunications network who a) consumed the content item in the set of content items and b) are determined to be similar to the requesting subscriber based on subscriber network traffic information collected by the telecommunications network;

calculate a subscriber similarity factor for the content item in the set of content items using the first total number of subscribers and the second total number of subscribers;

calculate a rank value for the content item in the set of content items using the calculated subscriber similarity factor and assigning the calculated rank value to the content item in the set of content items and reordering the content item in the set of content items based on the calculated rank value; and present the result to the requesting subscriber as an ordered list.

9. The content ranking system of claim 8, wherein the data processing system is configured to calculate the rank value for the content item further based on a point in time at which one of the subscribers accessed the telecommunications network in consuming the content item in the set of content items, and is configured to calculate the rank value by:

determining an amount of time between i) a point in time when the query was received and ii) the point in time when a subscriber consumed the content item in the set of content items;

calculating a time factor using the determined amount of time; and
calculating the rank value using the time factor.

10. The content ranking system of claim 9, wherein the data processing system is configured to calculate the time factor using the determined amount of time by: determining whether the determined amount of time is between a first threshold and a second threshold;
  in response to determining that the determined amount of time is between the first and second thresholds, deriving a value based on the determined amount of time; and
  calculating the time factor using the derived value.

11. The content ranking system of claim 8, wherein
  the query is received from a requesting subscriber's communication device when the communication device is located at a first location, and
  the data processing system is configured to calculate the rank value to assign to the content item based on the first location by:
  determining a distance between i) the first location and ii) a second location, wherein the second location is a location at which a communication device of another subscriber was located when the another subscriber consumed the content item in the set of content items;
  calculating a location factor using the determined distance; and
  calculating the rank value using the location factor.

12. The content ranking system of claim 11, wherein the data processing system is configured to calculate the location factor using the determined distance by:
  determining whether the determined distance is between a first threshold and a second threshold;
  in response to determining that the determined distance is between the first and second thresholds, deriving a value based on the determined distance; and
  calculating the location factor using the derived value.

13. The content ranking system of claim 8, wherein the subscribers who are determined to be similar to the requesting subscriber includes subscribers i) who have a similar level of network service as a level of network service subscribed to by the requesting subscriber ii) who consumed the content item in the set of content items at a similar time as a time at which the query was received, iii) who have a similar travel pattern as a travel pattern of the requesting subscriber, or iv) who are determined to communicate with the requesting subscriber through the telecommunications network more than a threshold number of times.

14. The content ranking system of claim 13, wherein the subscribers who are determined to be similar to the requesting subscriber further includes subscribers who are determined based on the telecommunications network's collected data to have a similar interest as the requesting subscriber.

15. A computer program product comprising a non-transitory computer readable medium storing computer readable instructions, which, when executed by a data processing system connected to one or more network gateways of a telecommunications network, cause the data processing system to:
  receive from one of the one or more network gateways first information indicating that a first subscriber of the telecommunications network has consumed a first content item that was transmitted by a first content server external to the telecommunications network to the first subscriber through the telecommunications network;
  update a subscriber database comprising subscriber content consumption information identifying content items consumed by subscribers of the telecommunications network, wherein the updating the subscriber database comprises adding to the subscriber content consumption information a first subscriber information indicating that the first subscriber has consumed the first content item;
  receive second information indicating that a second subscriber of the telecommunications network has consumed a second content item that was transmitted by a second content server to the second subscriber, wherein the first content server is operated by a content hosting service that is different from a content hosting service that operates the second content server,
  add to the subscriber content consumption information a second subscriber information indicating that the second subscriber has consumed the second content item;
  obtain a search result identifying a set of content items that satisfy a query input by a requesting subscriber of the telecommunications network;
  for a content item included in the set of content items, use the subscriber content consumption information from the subscriber database to determine i) a first total number of subscribers of the telecommunications network who have consumed the content item in the set of content items and ii) a second total number of subscribers of the telecommunications network who a) consumed the content item in the set of content items and b) are determined to be similar to the requesting subscriber based on subscriber network traffic information collected by the telecommunications network;
  calculate a subscriber similarity factor for the content item in the set of content items using the first total number of subscribers and the second total number of subscribers;
  calculate a rank value for the content item in the set of content items using the calculated subscriber similarity factor and assigning the calculated rank value to the content item in the set of content items and reordering the content item in the set of content items based on the calculated rank value; and
  present the result to the requesting subscriber as an ordered list.

16. The computer program product of claim 15, wherein the computer readable instructions cause the data processing system to calculate the rank value for the content item further based on a time at which one of the subscribers accessed the telecommunications network in consuming the content item, and cause the data processing system to calculate the rank value by:
  determining an amount of time between i) a point in time that the query was received and ii) the point in time when a subscriber consumed the content item in the set of content items;
  calculating a time factor using the determined amount of time; and
  calculating the rank value using the time factor.

17. The computer program product of claim 16, wherein the computer readable instructions cause the data processing system to calculate the time factor using the determined amount of time by:
  determining whether the determined amount of time is between a first threshold and a second threshold;
  in response to determining that the determined amount of time is between the first and second thresholds, deriving a value based on the determined amount of time; and
  calculating the time factor using the derived value.

18. The computer program product of claim 15, wherein
the query is received from a requesting subscriber's communication device when the communication device is located at a first location, and
the computer readable instructions cause the data processing system to calculate the rank value to assign to the content item in the set of content items based on the first location by:
determining a distance between i) the first location and ii) a second location, wherein the second location is a location at which a communication device of another subscriber was located when the another subscriber consumed the content item in the set of content items;
calculating a location factor using the determined distance; and
calculating the rank value using the location factor.

19. The computer program product of claim 18, wherein the computer readable instructions cause the data processing system to calculate the location factor using the determined distance by:
determining whether the determined distance is between a first threshold and a second threshold;
in response to determining that the determined distance is between the first and second thresholds, deriving a value based on the determined distance; and
calculating the location factor using the derived value.

20. The computer program product of claim 15, wherein the subscribers who are determined to be similar to the requesting subscriber includes subscribers i) who have a similar level of network service as a level of network service subscribed to by the requesting subscriber ii) who consumed the content item in the set of content items at a similar time as a time at which the query was received, iii) who have a similar travel pattern as a travel pattern of the requesting subscriber, or iv) who are determined to communicate with the requesting subscriber through the telecommunications network more than a threshold number of times.

21. The computer program product of claim 20, wherein the subscribers who are determined to be similar to the requesting subscriber further includes subscribers who are determined based on the telecommunications network's collected data to have a similar interest as the requesting subscriber.

* * * * *